US010019370B2

(12) United States Patent
Abali et al.

(10) Patent No.: US 10,019,370 B2
(45) Date of Patent: Jul. 10, 2018

(54) PROBABILISTIC ASSOCIATIVE CACHE

(71) Applicant: International Business Machines Corporation, Armonk, NY (US)

(72) Inventors: Bulent Abali, Tenafly, NJ (US); John S. Dodson, Austin, TX (US); Moinuddin K. Qureshi, Atlanta, GA (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 15/200,572

(22) Filed: Jul. 1, 2016

(65) Prior Publication Data
US 2016/0314072 A1    Oct. 27, 2016

Related U.S. Application Data

(63) Continuation of application No. 13/460,873, filed on May 1, 2012, now Pat. No. 9,424,194.

(51) Int. Cl.
*G06F 12/02*     (2006.01)
*G06F 12/0864*   (2016.01)
*G06F 12/121*    (2016.01)
*G06F 12/0873*   (2016.01)
*G06F 12/0895*   (2016.01)
*G06F 12/128*    (2016.01)

(52) U.S. Cl.
CPC ...... *G06F 12/0864* (2013.01); *G06F 12/0873* (2013.01); *G06F 12/0895* (2013.01); *G06F 12/121* (2013.01); *G06F 12/128* (2013.01); *G06F 2212/1016* (2013.01); *G06F 2212/1056* (2013.01); *G06F 2212/281* (2013.01); *G06F 2212/305* (2013.01); *G06F 2212/313* (2013.01); *G06F 2212/6032* (2013.04); *G06F 2212/6082* (2013.01)

(58) Field of Classification Search
None
See application file for complete search history.

(56) References Cited

U.S. PATENT DOCUMENTS 5,465,342 A * 11/1995 Walsh ................. G06F 12/0864
                                                              711/119
6,223,256 B1    4/2001 Gaither
(Continued)

OTHER PUBLICATIONS

Jouppi, N.P.; "Improving direct-mapping cache performance by the addition of a small fully-associative cache and prefetch buffers"; 17th Annual International Symposium on Computer Architecture Proceedings, 2001; pp. 364-373.

*Primary Examiner* — Edward Dudek, Jr.
*Assistant Examiner* — Ryan Dare
(74) *Attorney, Agent, or Firm* — Whitham, Curtis & Cook, PC; Daniel P. Morris

(57) ABSTRACT

A computer cache memory organization called Probabilistic Set Associative Cache (PAC) has the hardware complexity and latency of a direct-mapped cache but functions as a set-associative cache for a fraction of the time, thus yielding better than direct mapped cache hit rates. The organization is considered a (1+P)-way set associative cache, where the chosen parameter called Override Probability P determines the average associativity, for example, for P=0.1, effectively it operates as if a 1.1-way set associative cache.

2 Claims, 4 Drawing Sheets

(56) References Cited

U.S. PATENT DOCUMENTS

| | | |
|---|---|---|
| 6,338,117 B1 | 1/2002 | Challenger et al. |
| 6,912,628 B2 | 6/2005 | Wicki et al. |
| 7,284,096 B2 | 10/2007 | Schreier |
| 2006/0248287 A1* | 11/2006 | Buyuktosunoglu . G06F 12/0833 711/146 |
| 2009/0132764 A1 | 5/2009 | Moll et al. |
| 2010/0011165 A1 | 1/2010 | Rossi |
| 2010/0325374 A1 | 12/2010 | Cypher et al. |

* cited by examiner

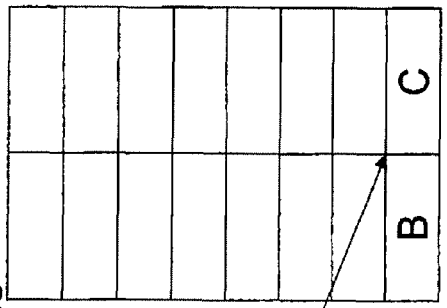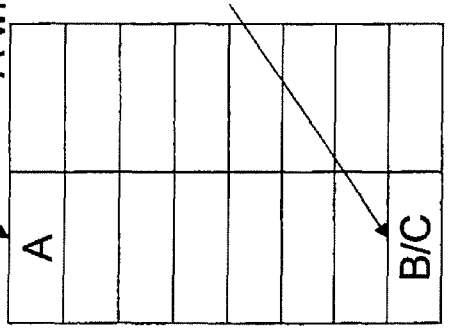
FIG. 4

PROBABILISTIC ASSOCIATIVE CACHE

BACKGROUND OF THE INVENTION

Field of the Invention

The present application generally relates to computer system memories and, more particularly, to very large dynamic RAM (DRAM) based cache memories which achieve set associative cache performance with the cost and complexity of a direct-mapped cache organization.

Background Description

N-way set associative caches are typically employed for improving the hit rate of cache memories. N-way set associative caches, where N>1, are complex, power hungry, and cost prohibitive compared to direct mapped caches, especially in very large caches constructed using DRAM for both the directory and data arrays. Therefore, a 1-way set associative cache organization, commonly referred to as a direct-mapped cache, is the preferred cache organization for very large caches built out of DRAM.

A problem with direct-mapped caches is their lower hit rate in comparison to set-associative caches, negatively impacting cache performance.

SUMMARY OF THE INVENTION

According to the present invention, there is provided a computer cache memory organization, called Probabilistic Set Associative Cache (PAC), that has the hardware complexity and latency of a direct-mapped cache but has the performance of a set-associative cache.

The Probabilistic Associative Cache (PAC) solves the problem of lower hit rate of a direct-mapped cache in comparison to set-associative caches. The PAC is physically similar to a direct mapped cache; however, the PAC functions as a direct mapped cache a fraction of the time with a chosen probability called Override Probability P, where 0<P<1 and P is relatively small. For 1−P of the time, PAC functions as a direct mapped cache (e.g., 1−P=0.9), 90% of the time). However, for a small fraction of the time (e.g., P=0.1), PAC functions as a 2-way cache, especially for those cache sets which have frequent cache misses due to address conflicts. Effectively, the PAC cache may be considered a (1+P)-way set associative cache where P<<1.0.

The PAC has the following characteristics:

(a) Misses: PAC uses a novel a cache replacement algorithm to implement (1+P)-way associativity: on cache misses the cache block in the direct mapped set position is evicted with 1−P probability (e.g., 90%). Otherwise with P probability (e.g., P=10%), a 2-way like cache block replacement policy is used, such as LRU (least recently used) or Random policy, which evict one of the two cache blocks in a 2-way set. The benefit of this replacement policy is that those sets of a direct mapped cache which miss very frequently due to conflict misses will become 2-way sets with a high probability as determined by the P parameter.

(b) Hits: On cache accesses, the accessed cache set is always assumed a 2-way, and it is searched sequentially starting with the direct mapped address position. Since cache blocks are placed with a high probability 1−P in a direct mapped location and with P probability in a 2-way associative location, when cache access is a hit, we expect 1−P percent of the hits to be in the direct mapped position resulting in one cycle access to the cache. In other words, for 1−P fraction of the time, the cache will function as if a direct-mapped cache. For the remaining P percent of hits, the requested cache block is expected to be found in one of the two positions: either in the direct mapped position (one cycle access) or the alternate position (two cycles access) in the 2-way set; therefore, the access completes in one or two cycles, or 1.5 cycles on the average for P percent of the hits.

(c) Latency: Average hit time of the PAC is expected to be [(1−P)*1+P*1.5] cycles. For example, with a chosen Override Probability of P=0.1, the average access time computes as 1.05 cycles. This is 5% longer than a direct mapped cache access time of one cycle. However, increased average hit latency is compensated by a reduced miss rate due to the set associative nature of the invention. An optimal P value may be selected which results in the best average access time which take in to account both the hit latency and the miss penalty.

In sum, the PAC organization has the following features and benefits:

(a) It eliminates the hardware cost and complexity of an N-way cache.

(b) It reduces the need for a separate victim cache typically used for mitigating performance impact of a direct mapped cache.

(c) Area and power requirements of PAC are similar a direct mapped cache. The main differences between a direct mapped cache and the PAC are one additional address tag bit to implement 2-way tags in PAC and the cache replacement algorithm.

(d) The PAC provides set associative cache like performance, but inexpensively, using a direct-mapped cache organization.

BRIEF DESCRIPTION OF THE DRAWINGS

The foregoing and other objects, aspects and advantages will be better understood from the following detailed description of a preferred embodiment of the invention with reference to the drawings, in which:

FIG. 4 is block diagram illustrating an example of an address A placed in its home location in the cache directory and accessed in one cycle from then on, and an example of addresses B and C competing for the same home location but after some number of misses are placed in home and neighbor locations, respectively, therefore behaving as in a 2-way set associative cache from then on (with 1.5 cycle average hit latency).

DETAILED DESCRIPTION OF A PREFERRED EMBODIMENT OF THE INVENTION

Figure 1:
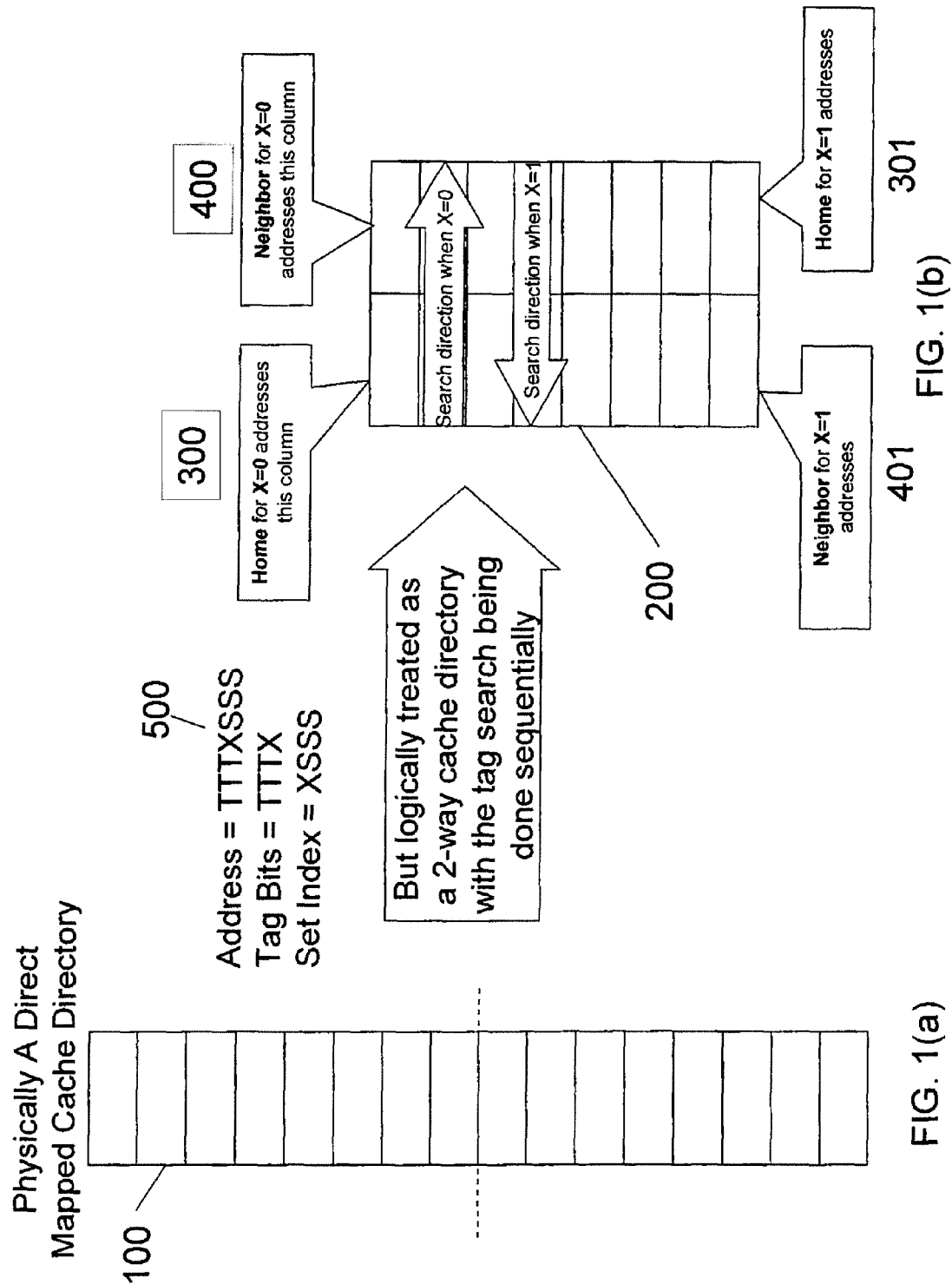
FIGS. 1(a) and 1(b) are a block diagrams which shows the physical and logical views of the probabilistic set associative cache directory according to the invention.

Referring now to the drawings, and more particularly to FIG. 1, there is illustrated a direct mapped cache directory 100 that typically contains address tags for the memory being cached. If memory data is cached in the direct mapped cache, then the tag portion (TTT) of the data address is placed in the directory location indexed by the index portion (SSSS) of the data address. To check if the data is cached or not, the tag found in the directory location is compared to the tag portion of the address presented to the cache. If the tags match then it is called a hit, which means that the data is found in the cache. If the tags do not match then it is called a miss, which means that the data is not found in the cache.

According to the invention, the direct mapped cache is logically treated as a 2-way set associative cache in the exemplary embodiment 200 illustrated in FIG. 1(*b*) and N-way in the general embodiment, where N>2. Two way associative means that the requested data may be found in one of two locations in the cache. State of the art 2-way associative caches do this search in parallel, however, increasing the hardware cost, power, and complexity which is the problem solved by this invention. In this invention, logical means that the two tag comparisons are to be done sequentially, one at time, as if a direct mapped cache. Two potential locations for the same address require an additional tag bit in the tag as indicated by the X bit 500 in FIG. 1.

An address presented to the cache is to be searched sequentially first by examining the "home location" 300,301 and then the "neighbor location" 400,401. Home location is determined by the X bit of the address. If a memory address has its X bit=0, then it's home location is on the left hand side 300 and its neighbor on the right hand side 400. If an address has its X bit=1, then it's home location in the cache is on the right hand side 301 and its neighbor on the left hand side 401.

Figure 2:
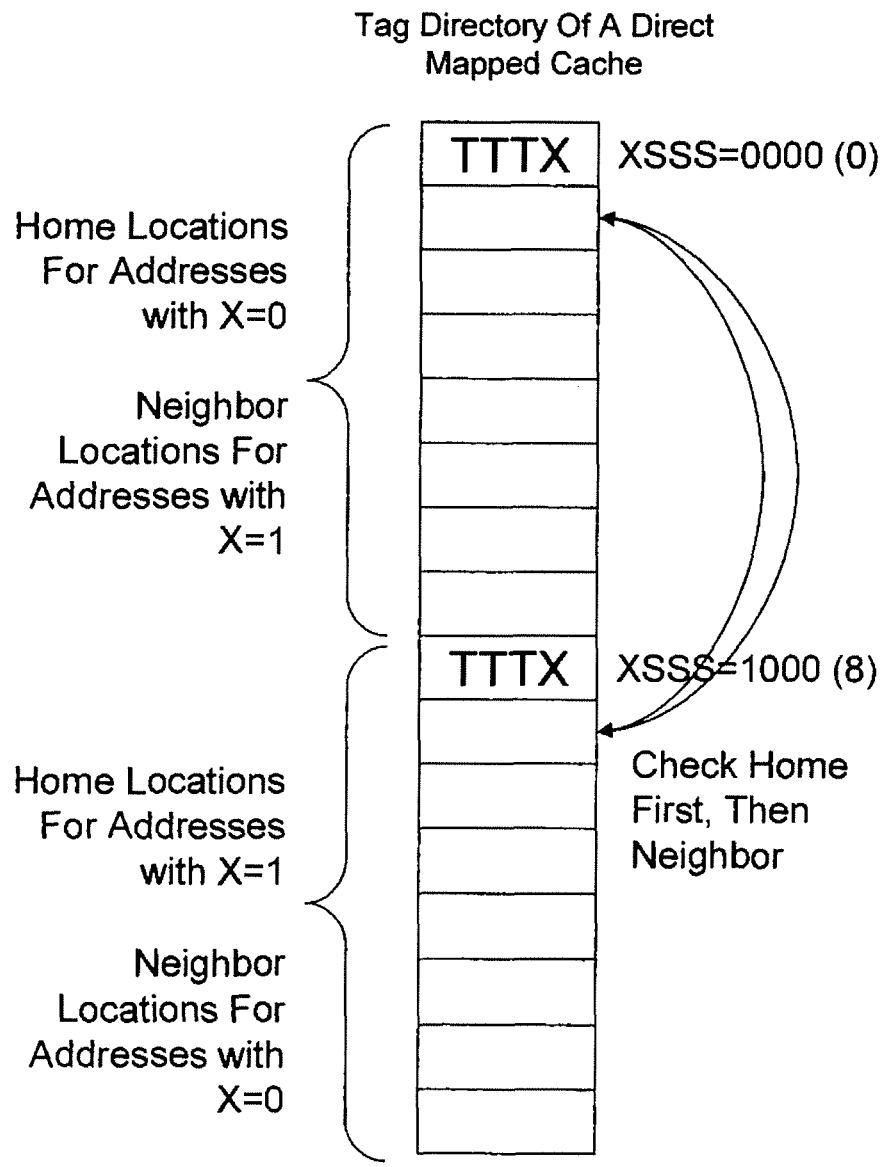
FIG. 2 is a block diagram which shows how the cache tags are searched sequentially starting with the home location and then the neighbor location.

FIG. 2 illustrates the idea of searching home first and then neighbor second. Think of this direct mapped cache as logically a 2-way associative cache. The two cache tags are searched sequentially: search Home first, then search Neighbor second. The conventions used in FIG. 2 are Address=TTTXSSS, TTTX are the tag bits, and XSSS are the directory index.

Figure 3:
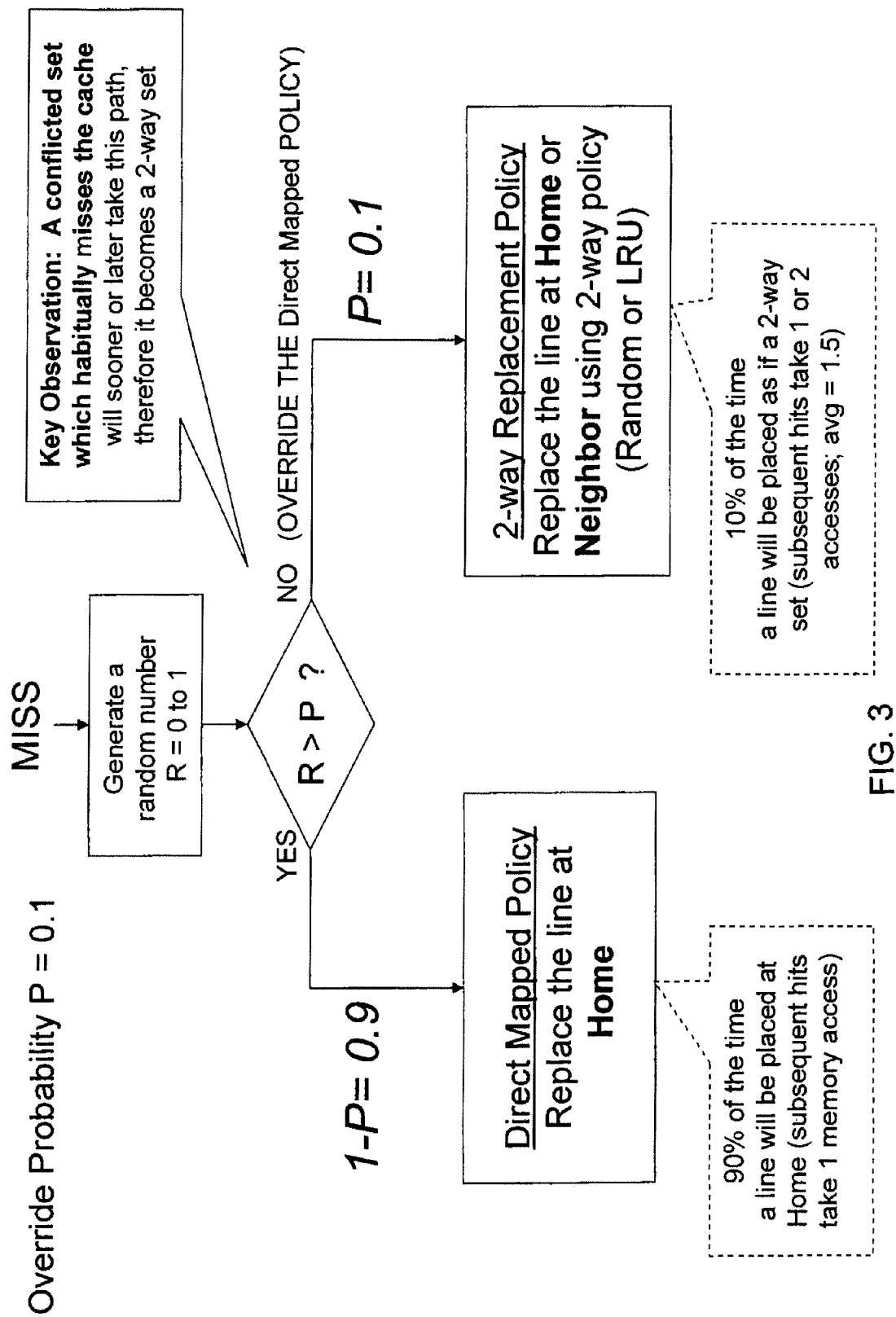
FIG. 3 is a flow diagram which shows the logical implementation of the cache block replacement algorithm used when it is a miss.

FIG. 3 illustrates the cache replacement policy of the invention. A parameter called Override Probability (P) is used, whose value is between 0.0 and 1.0. The P value may be statically chosen at the hardware design time or statically chosen during run time of the subject computer system or may be adjusted dynamically based on observed performance of the subject memory system. In the example of FIG. 3, the P value is chosen as 0.1.

When a cache miss occurs, the replacement algorithm takes one of the two branches as illustrated in the flowchart of FIG. 3. Branch direction is decided by a random number generator in this embodiment of the invention. In this embodiment, the random number generator is referred to as an "oracle". The cache system generates a random number R between 0.0 and 1.0. Without losing generality, in other embodiments of this invention a different range of R and P values may be used, and the random number generator may use a variety of statistical distributions and other oracles may be employed in deciding which branch to take. In the exemplary embodiment the random number generator produces uniformly distributed values between 0.0 and 1.0.

If the random value R is greater than Override Probability P then the cache block replacement policy follows the direct mapped replacement policy. It means that the cache block in the home location of the missed address is evicted from the cache and is replaced by the requested block. Following the example of FIG. 3, since P=0.1 it means that 90% of the cache misses will take this branch as decided by the random number generator and P.

If the random value R≤P, then the cache block replacement policy follows a 2-way set associative replacement policy. The 2-way replacement policy could be the well known LRU, or Random, or any other set associative replacement policy. Thus, one of the two blocks found in the home and neighbor cache locations is evicted from the cache. The evicted block is replaced by the requested block. Following the example of FIG. 3, it means that 10% of the cache misses will take this branch as determined by the random number generator and the chosen Override Probability of P=0.1.

FIG. 4 illustrates two examples of blocks being placed and used in the PAC cache. The address of A has the X bit position being 0. When A is placed in the PAC cache, with 90% probability it will be placed in its home location, that is, the left hand side. From then on, A will be accessed in one cycle, as the cache is always searched starting with the home location. In the second example of FIG. 4, the addresses of B and C both have X=0, and they map to the same set in the cache; that is, B and C are competing for the same home location. B and C will evict each other a number of times with 90% probability per turn, as illustrated by the string B . . . C . . . B . . . C . . . Note that the probability of either B or C taking the 2-way replacement branch of the replacement algorithm is only 10% per turn, but it approaches 100% as they take many turns evicting each other. For example, initially B's probability of taking this branch is 10%, whereas in the third turn, the probability of B taking the 2-way replacement branch is 40%. Sooner or later, as the probabilities accumulate, the 2-way branch will be taken, and one of B and C will find itself in the neighbor location as illustrated in FIG. 4 by B in the home and C in the neighbor location, respectively. From then on, every access to B and C are considered a cache hit because they are both in the cache now. Since tag searches are done sequentially and starting with the home node first, access to B will be done in one cycle. Access to C will require checking home location first, and since not found there, then checking the neighbor location; therefore, it takes two cycles.

Note that in other embodiments of the invention, the direct-mapped cache may be substituted with an M-way cache and the 2-way cache may be substituted with an N-way cache (where N>M), while remaining elements of the preferred embodiment being the same. For example, in a second embodiment, a 4-way set probabilistic set associative cache may be constructed out of a 2-way set associative cache, with the cache search and replacement policies being identical to that of the preferred embodiment.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer Probabilistic Set Associative Cache (PAC) cache memory
   physically organized as a direct mapped cache;
   configured to be accessed with a cache tag search policy of a set-associative cache, in which one or more extra bits in cache directory entries are employed in addition to a direct mapped cache tag in order to implement a (1+P)-way set associative cache, where P is an override probability parameter chosen to determine average associativity,
   wherein the one or more extra bits indicate a home location node from a plurality of nodes within a given set,
   wherein the cache tag search policy searches the home location node prior to a remainder of the plurality of nodes when searching the given set; and
   configured to be modified by a replacement algorithm which implements two different replacement algorithms in one, namely a direct mapped and a (1+P)-way set associative replacement algorithm, where 0<P<1, wherein each node of said plurality of nodes is usable to cache only a single address at a time, wherein a home location node is only a portion of cache memory, wherein the one or more extra bits must allow designating a location storing a single address within a set, wherein the cache directory is searched sequentially starting with the home location node to determine if the requested address is found (hit) or not (miss) in the cache, and wherein on cache misses a cache block in a direct mapped set position is evicted with 1-P probability, otherwise with P probability, a 2-way cache block replacement policy is used which evicts one of two cache blocks in a 2-way set.

2. A method of operation of a computer cache memory as a Set Associative Cache (PAC) comprising the steps of:

physically organizing the computer cache memory as a direct mapped cache;

employing a cache tag search policy of a set-associative cache in which one or more extra bits in cache directory entries are employed in addition to a direct mapped cache tag in order to implement a (1+P)-way set associative cache, where P is an override probability parameter chosen to determine average associativity, wherein the one or more extra bits indicate a home location node from a plurality of nodes within a given set, wherein the cache tag search policy searches said home location node prior to a remainder of said plurality of nodes when searching said given set; and employing a replacement algorithm which implements two different replacement algorithms in one, namely a direct mapped replacement algorithm and a (1+P)-way set associative replacement algorithm, where 0<P<1, wherein each node of said plurality of nodes is usable to cache only a single address at a time, wherein a home location node is only a portion of cache memory, wherein the one or more extra bits must allow designating a location storing a single address within a set, further comprising the steps of sequentially searching starting with the home location node to determine if a requested address is found (hit) or not (miss) in the cache memory, and on cache misses evicting a cache block in a direct mapped set position with 1-P probability, otherwise with P probability, using a 2-way cache block replacement policy which evicts one of two cache blocks in a 2-way set.

* * * * *